G. SHELTON.
Fruit-Picker.
No. 207,988.　　　　　　　Patented Sept. 10, 1878.
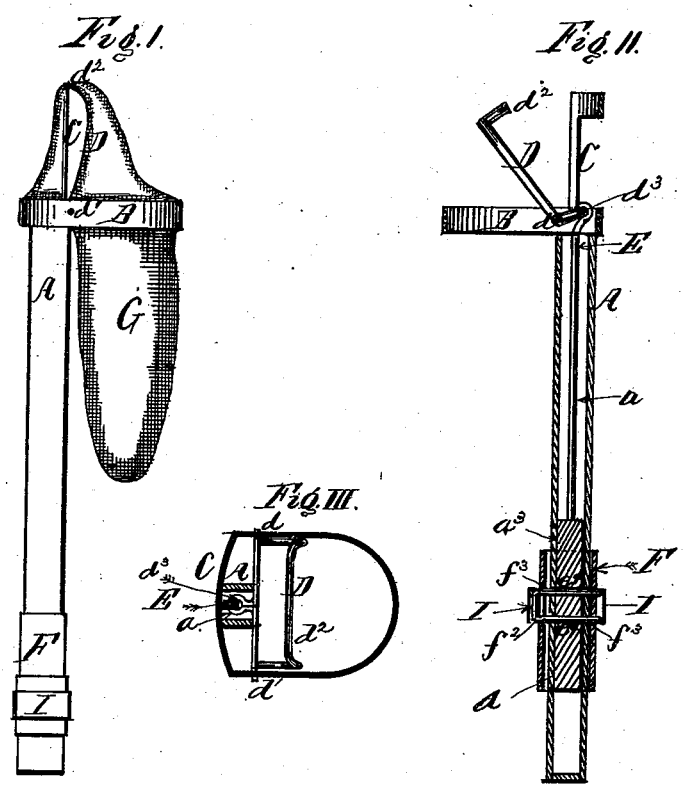
Witnesses:
Inventor:
Gillum Shelton
Per: Henry Gerner
Atty.

UNITED STATES PATENT OFFICE.

GILLUM SHELTON, OF NORMAL, ILLINOIS.

IMPROVEMENT IN FRUIT-PICKERS.

Specification forming part of Letters Patent No. 207,988, dated September 10, 1878; application filed January 31, 1878.

*To all whom it may concern:*

Be it known that I, GILLUM SHELTON, of Normal, county of McLean, and State of Illinois, have invented new and useful Improvements in Fruit-Pickers; and I do declare that the following is a clear and exact description of the same, reference being had to the accompanying drawings, forming a part of this specification.

The object of my invention is to produce a simple, effective, and cheaply-constructed apparatus for picking fruit of every description.

My invention consists of a hollow handle of any desired length, to the top of which is attached a metal frame consisting of a nearly-circular rim of metal, to the top and rear end of which is fastened a concave upright, forming the stationary jaw. This jaw is merely a skeleton to obtain lightness. To the inside of the said circular rim is pivoted a movable jaw, consisting of two upright side pieces and a horizontal convex end piece. Projecting rearwardly from this movable jaw to a point directly over the opening of the hollow handle, and out of the path of the fruit, is a lever-arm, to the end of which is attached a rod extending downwardly through the hollow handle to a point at the lower end of the same, where it is connected to a sliding sleeve by aid of a bent hook or pin, which passes through slots in the handle. This bent hook or pin is held in place by a strap or band surrounding the same. To the lower side of the circular rim is attached a bag or receiver to catch picked fruit.

The movable and stationary jaws are covered to prevent them from injuring the fruit, and to guide the same into the bag.

In order to more fully describe my invention, I refer to the accompanying drawings, of which—

Figure 1 is a side view of my improved fruit-picker. Fig. 2 is a sectional view. Fig. 3 is a plan view of the fruit-picker with the covering removed.

A is the handle, with hole $a$. B is the circular metal rim, with concave standard or stationary jaw C. D is the movable jaw, pivoted or fulcrumed to the rim at $d$ $d^1$, and provided with a convex end piece, $d^2$. E is the arm or rod, fastened to the lever-arm of the movable jaw at $d^3$, and extending downward through the hole $a$ in handle A. This arm is attached at or near the lower end of the handle, within reach of the operator, to a sliding sleeve, F, which surrounds the outer circumference of the handle. The sleeve F is attached to the arm E by the hook or pin $f^2$, which passes through holes $f^3$ in the sleeve, slots $a^3$ in handle, and holes $e^4$ in the arm. This hook or pin is held in place by the band I or other suitable means.

G is a bag, fastened to the under side of the rim B by threads passing through holes in the same, or in any other convenient manner.

The covering upon the movable and stationary jaws extends to the rim, so as to cover and protect the operating parts. The lever-arm of the movable jaw is attached, as hereinbefore stated, to its rod directly over the opening in the handle, and lies just within the circular rim, beneath the covering to the stationary jaw.

To operate my fruit-picking apparatus, I slide the sleeve upward until the movable jaw is opened, then place the fruit between the two jaws. After that I slide the sleeve down, which will cause the movable jaw to pinch the stem of the fruit between the same and the stationary jaw. Then I give the apparatus a twist, which will break the stem and cause the fruit to fall into the bag G.

Having thus described my invention, I desire to claim—

1. The fruit-picker consisting of the hollow handle, the rod sliding therein, the receptacle attached to rim B, the stationary jaw, and the movable jaw pivoted in the rim, and having its lever-arm attached to the rod directly over the opening of the hollow handle, inside of the rim, substantially as described.

2. The combination of the movable and stationary jaws, the hollow handle, the rod, the sleeve, and the pin passing through the sleeve, rod, and handle, and playing in a slot of the latter.

GILLUM SHELTON.

Witnesses:
 CHARLES R. PARK,
 ALBERT F. STEPHENSON.